(12) United States Patent
Burgman et al.

(10) Patent No.: US 10,486,517 B2
(45) Date of Patent: Nov. 26, 2019

(54) CONCENTRIC BRIDGE GEAR SYSTEM

(71) Applicant: GM GLOBAL TECHNOLOGY OPERATIONS LLC, Detroit, MI (US)

(72) Inventors: Boris Burgman, Oak Park, MI (US); Goro Tamai, Bloomfield Hills, MI (US); John A Diemer, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 418 days.

(21) Appl. No.: 15/260,747

(22) Filed: Sep. 9, 2016

(65) Prior Publication Data

US 2018/0072149 A1     Mar. 15, 2018

(51) Int. Cl.
*F16H 57/08* (2006.01)
*B60K 6/365* (2007.10)
*B60K 6/46* (2007.10)
*F16H 3/72* (2006.01)

(52) U.S. Cl.
CPC ............ *B60K 6/365* (2013.01); *F16H 57/08* (2013.01); *B60K 6/46* (2013.01); *B60Y 2200/92* (2013.01); *B60Y 2400/73* (2013.01); *F16H 3/728* (2013.01); *F16H 2200/2007* (2013.01); *F16H 2200/2041* (2013.01); *Y10S 903/91* (2013.01)

(58) Field of Classification Search
CPC ........ F16H 57/08; F16H 57/082; F16H 3/728; F16H 3/66; F16H 2200/2007
See application file for complete search history.

(56) References Cited

U.S. PATENT DOCUMENTS

| | | |
|---|---|---|
| 8,702,544 B2 | 4/2014 | Tamai et al. |
| 8,840,500 B2 | 9/2014 | Tamai et al. |
| 9,017,203 B2 | 4/2015 | Tamai et al. |
| 9,453,572 B2 | 9/2016 | Tamai et al. |

OTHER PUBLICATIONS

US Application filed Aug. 1, 2016; U.S. Appl. No. 15/224,963, Applicant: GM Global Technology Operations LLC; Title: Wide Range Compound Split Transmission With Fixed Input Gear Reduction Ratio.

*Primary Examiner* — Erin D Bishop

(57) ABSTRACT

A planetary gear assembly for transferring torque in a transmission includes first and second planetary gear sets, each including a ring gear, a sun gear, and a carrier bearing a plurality of planet gears. A bridge portion connects a first carrier of the first planetary gear set to a second ring gear of the second planetary gear set. The bridge portion may be disposed radially outward of the first sun gear, and the bridge portion may be connected to an outer side of the first carrier. In some examples, a first ring bearing assembly is constrained by the first ring gear and the bridge structure; a first carrier bearing assembly is constrained by a first case portion and a bridge extension extending from the first carrier; and a second ring bearing assembly is constrained by a second case portion and a second bridge extension extending from the second ring gear.

19 Claims, 6 Drawing Sheets

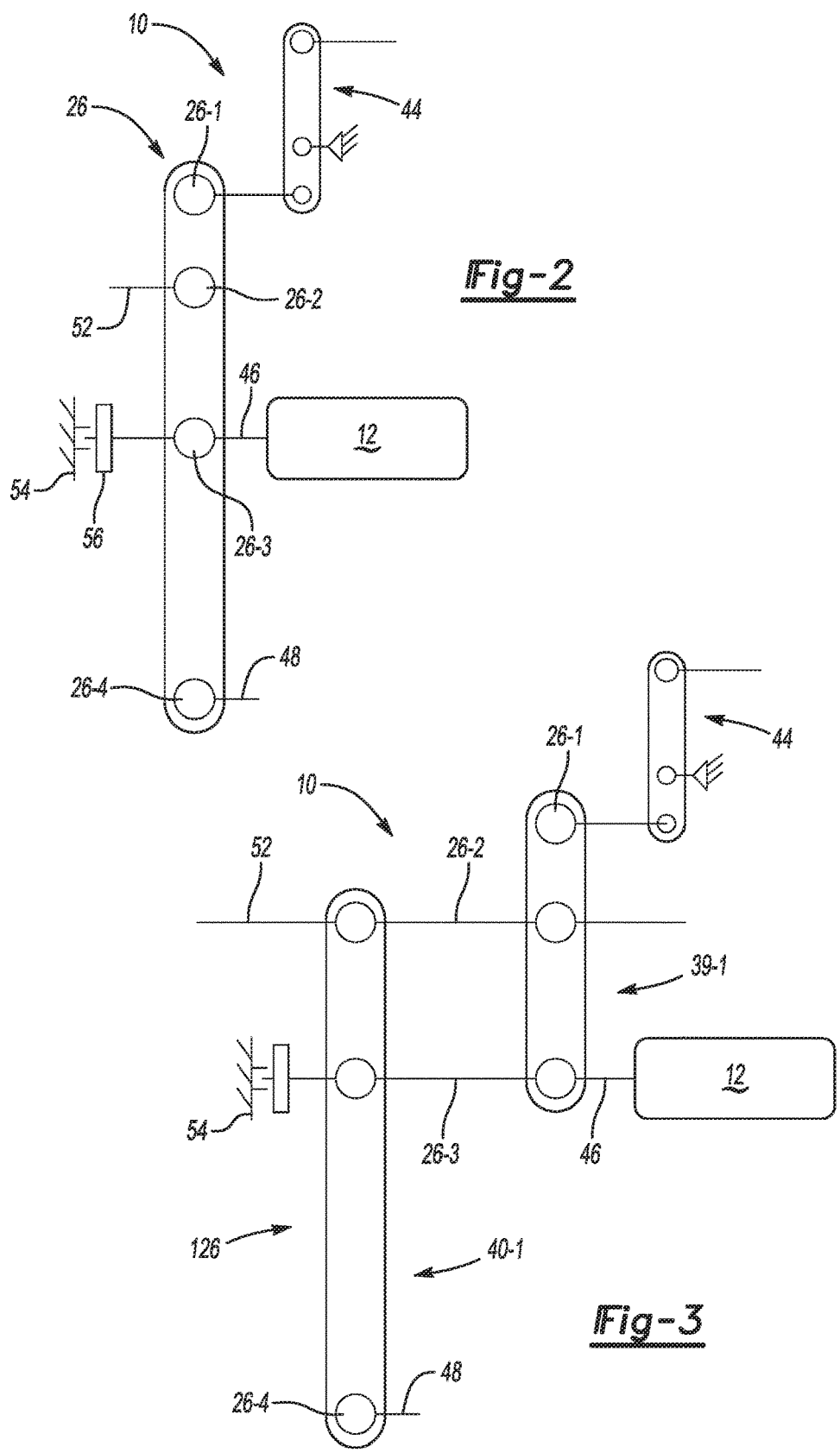

CONCENTRIC BRIDGE GEAR SYSTEM

TECHNICAL FIELD

The present disclosure relates to an electro-mechanical drive system, and more particularity, to an electro-mechanical drive system having a plurality of planetary gear sets.

INTRODUCTION

To produce a more efficient vehicle, hybrid vehicle propulsion systems combine an electric motor and a conventional internal combustion engine. Torque from the engine and the electric motor is typically channeled to the vehicle's driven wheels via a transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's propulsion system will have one or more motor-generators and no internal combustion engine.

In either a hybrid or purely electric propulsion system, the electric motors are operatively connected to a transmission which includes planetary gearing such that torque and speed of the electric motors may be selected independently of vehicle speed and desired acceleration. In a hybrid propulsion system, control of the engine is typically achieved by varying individual torque contribution from the electric motor(s). Thus, such hybrid and purely electric propulsion systems may each provide selectable torque contribution from their electric motors, and, in the case of the hybrid powertrain, may similarly provide a selectable torque contribution from the engine to drive the subject vehicle.

The planetary gear sets combined with other gears may create an undesirable bending load on the transmission input shaft. In addition, structure associated with the planetary gear sets consumes valuable space along the input shaft of the transmission. Accordingly, there is a need for improved planetary gear transmissions for hybrid and electric vehicles.

SUMMARY

To minimize space required for two interconnected planetary gear sets and to reduce bending loads on the input shaft(s), the ring gear of the first planetary gear set, and associated bearings, may be mounted concentrically with a bridge structure formed by the ring gear of the second planetary gear set and the carrier of the first planetary gear set. Further, the bridge structure including the second ring gear and the first carrier may span between two portions of the stationary case structure.

In one form, which may be combined with or separate from the other forms disclosed herein, a planetary gear assembly for transferring torque in an automotive transmission is provided. A first planetary gear set includes a first sun gear, a first ring gear, and a first carrier bearing a plurality of first planet gears. The first planet gears are in meshing engagement with at least one of the first sun gear and the first ring gear. Each first planet gear is configured to translate about the first sun gear. The first carrier has an inner side disposed adjacent to the first sun gear and an outer side disposed adjacent to the first ring gear. A second planetary gear set is disposed adjacent to the first planetary gear set. The second planetary gear set has a second sun gear, a second ring gear, and a second carrier bearing a plurality of second planet gears. The second planet gears are in meshing engagement with at least one of the second sun gear and the second ring gear. Each second planet gear is configured to translate about the second sun gear. A bridge portion connects the second ring gear to the outer side of the first carrier, and the bridge portion is disposed radially outward of the first sun gear. The bridge portion, the second ring gear, and the first carrier together form a bridge structure.

In another form, which may be combined with or separate from the other forms disclosed herein, a planetary gear assembly for transferring torque in an automotive transmission is provided, which also includes first and second planetary gear sets. The first planetary gear set has a first sun gear, a first ring gear, and a first carrier bearing a plurality of first planet gears. The first planet gears are in meshing engagement with at least one of the first sun gear and the first ring gear. The second planetary gear set is disposed adjacent to the first planetary gear set, and the second planetary gear set has a second sun gear, a second ring gear, and a second carrier bearing a plurality of second planet gears. The second planet gears are in meshing engagement with at least one of the second sun gear and the second ring gear. A bridge portion connects the second ring gear to the first carrier. A first bridge extension extends from the first carrier, and a second bridge extension extends from the second ring gear. The bridge portion, the second ring gear, the first carrier, the first bridge extension, and the second bridge extension together form a bridge structure. A first bearing arrangement includes at least one first ring bearing assembly constrained by, or supporting, the first ring gear and the first carrier. A first case portion is provided, which is coupled to a second case portion. A second bearing arrangement includes a first carrier bearing assembly constrained by the first case portion and the first bridge extension and a second ring bearing assembly constrained by the second case portion and the second bridge extension.

In yet another form, which may be combined with or separate from the other forms disclosed herein, an electro-mechanical drive unit for a motor vehicle includes a stationary member and a planetary gear arrangement including a first planetary gear set interconnected with a second planetary gear set to form a first junction point, a second junction point, a third junction point, and a fourth junction point. The first planetary gear set includes a first sun gear, a first ring gear, and a first carrier bearing a plurality of first planet gears. The first planet gears are in meshing engagement with at least one of the first sun gear and the first ring gear. Each first planet gear is configured to translate about the first sun gear. The second planetary gear set is disposed adjacent to the first planetary gear set. The second planetary gear set has a second sun gear, a second ring gear, and a second carrier bearing a plurality of second planet gears. The second planet gears are in meshing engagement with at least one of the second sun gear and the second ring gear. Each second planet gear is configured to translate about the second sun gear. A bridge portion connects the second ring gear to the first carrier. A first motor-generator is operatively connected to the fourth junction point of the planetary gear arrangement. A second motor-generator is operatively connected to the first junction point of the planetary gear arrangement. An output member is operatively connected to the second junction point of the planetary gear arrangement.

A torque-transmitting mechanism is engageable to ground the third junction point to the stationary member. A first bearing arrangement is also provided, which includes at least one first ring bearing assembly constrained by the first ring gear and the bridge structure.

Additional features may be included with any form of the disclosure, without limitation, such as the following: a first bearing arrangement including at least one first ring bearing assembly constrained by the first ring gear and the bridge structure; a first transfer gear in meshing engagement with an outer side of the first ring gear; an input member extending along a central axis; at least one gear of the first and second planetary gear sets being operatively coupled to the input member such that torque is transferred from the input member to the at least one gear of the first and second planetary gear sets; a middle part of the bridge portion having a conical shape; the planetary gear assembly being free of any bearing assembly constrained by both the input member and the first ring gear; the planetary gear assembly being arranged such that a first load is substantially transferred from the first transfer gear to the first ring gear and through the first bearing arrangement to the bridge structure without being substantially transferred to the input member; the bridge structure further comprising a first bridge extension extending from the first carrier and a second bridge extension extending from the second ring gear; a first case portion; a second case portion coupled to the first case portion; a second bearing arrangement including a first carrier bearing assembly constrained by the first case portion and the first bridge extension and a second ring bearing assembly constrained by the second case portion and the second bridge extension; a second transfer gear in meshing engagement with an outer side of the second ring gear; an electric motor-generator operatively coupled to at least one of the first and second transfer gears such that torque is transmitted between the electric motor-generator and the at least one of the first and second transfer gears; the planetary gear assembly being free of any bearing assembly constrained by both the input member and the bridge structure; the planetary gear assembly being arranged such that a second load is substantially transferred from the second transfer gear to the bridge structure and through the second bearing arrangement to the first and second case portions without being substantially transferred to the input member; each of the first and second bearing arrangements comprising at least one of a ball bearing and a roller bearing.

The above features and advantages and other features and advantages are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way.

FIG. 2 is a schematic lever diagram illustration of the EVT presented in stick diagram form in FIG. 1, according to the principles of the present disclosure;

FIG. 3 is another representation of the schematic lever diagram illustration of the EVT presented in FIG. 2 and the stick diagram form in FIG. 1, in accordance with the principles of the present disclosure;

DETAILED DESCRIPTION

Figure 1:
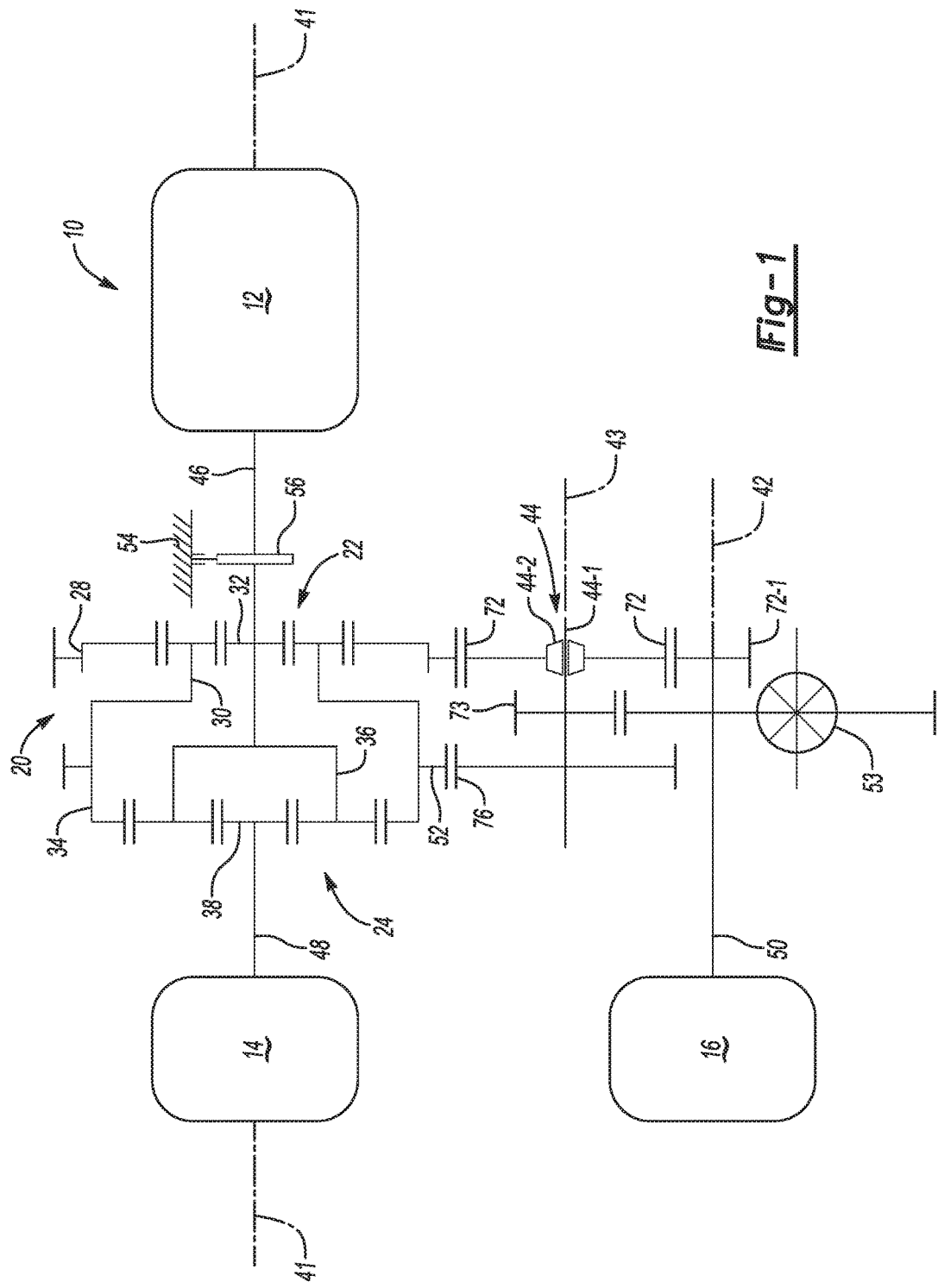
FIG. 1 is a schematic stick diagram illustration of an example wide-node compound-split electrically variable transmission (EVT) employed as part of a hybrid propulsion system for a vehicle, in accordance with the principles of the present disclosure.

Referring to the drawings, wherein like reference numbers refer to like components, FIG. 1 illustrates a hybrid propulsion system 10 configured to launch and propel a vehicle, e.g., to operate the vehicle in all speed ranges between low and high road speeds. The hybrid propulsion system 10 includes multiple power sources, which include an internal combustion engine 12, a first electric motor-generator 14, and a second electric motor-generator 16, all connected to an electro-mechanical drive unit that is depicted as an "electrically variable transmission" (EVT) 18. It should be understood, however, that in other variations of the hybrid propulsion system 10, a single electric motor-generator could alternatively be used, without falling beyond the spirit and scope of the present disclosure.

The propulsion system 10 additionally has an energy storage system that includes one or more batteries that are not specifically shown, but are known by those skilled in the art. The energy storage system is operatively connected to the first and second motor-generators 14, 16 such that the motor-generators 14, 16 may transfer torque to or receive torque from the engine 12. Although not shown, the propulsion system 10 also includes a controller or an electronic control unit (ECU). The controller is operatively connected to the power sources and to the energy storage system to control the distribution of torque from the power sources to the EVT 18.

The EVT 18 is a transmission planetary gear train operatively connected to each of the engine 12, the first motor-generator 14, and the second motor-generator 16. Channeling respective torques of the engine 12 and the two motor-generators 14, 16 to different members of the planetary gear train permits one of the power sources to either assist or balance the operation of any of the other two. Thus, the combination of one engine 12 and two motor-generators 14, 16 operatively connected to the EVT 18 allows speeds and torques of the engine 12 and motor-generators 14, 16 to be controlled and selected independently in order to power a subject vehicle more efficiently.

Although the hybrid propulsion system 10 as shown includes the engine 12, the EVT 18 may also be connectable solely to the first and second electric motor-generators 14, 16. In such a case, the propulsion system 10 would no longer be a hybrid type, but would become purely electric, and the EVT 18 may then be broadly described as an electromechanical drive unit. For simplicity and clarity, the remainder of the present description will refer to the electromechanical drive unit as EVT 18 being connected to the engine 12, as well as to the motor-generators 14, 16. Additionally, the connections of the hybrid powertrain 10, to be described in greater detail below, may permit an overall decrease in torque requirement from the combination of the first and the second motor-generators 14, 16 while affording acceptable vehicle performance, as compared with other systems.

The electric motor-generators 14, 16 electrically connected to an energy storage device, such as a battery pack, and can operate in motoring mode and generating mode. In the motoring mode, the electric motor-generators 14, 16 can convert electrical energy received from the energy storage device into mechanical energy (e.g., torque). Conversely, when operating in the generating mode, the electric motor-generators 14, 16 coverts mechanical energy (e.g., torque) into electrical energy. The electrical energy generated by the electric motor-generators 14, 16 can then be transmitted to the energy storage device.

The EVT 18 includes two planetary gear sets represented in lever diagram form in FIGS. 2-3. A lever diagram is a schematic representation of the components of a mechanical device such as an automatic transmission. Each individual lever may represent an individual planetary gear set, a compound planetary gear arrangement having two or more interconnected planetary gear sets, or an external gear set. In the planetary gear set lever, the three basic mechanical components of the subject gear set, i.e., the sun gear, planet gear carrier, and ring gear members, are each represented by a junction point on the particular lever. Therefore, a typical single planetary gear set lever contains three junction points: one for the sun gear member, one for the planet gear carrier member, and one for the ring gear member. The relative length between the junction points of each planetary gear set lever can be used to represent the ring-to-sun gear ratio of each respective gear set. These lever ratios, in turn, are used to vary the gear ratios of the transmission in order to achieve appropriate ratios and ratio progression. Mechanical couplings or interconnections between the junction points of the various planetary gear sets are illustrated by thin, horizontal lines, and torque transmitting mechanisms such as clutches and brakes are presented as interleaved fingers. If the torque transmitting mechanism is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis" (1981), which is hereby fully incorporated by reference.

As may be seen in FIGS. 1-2, the EVT 18 includes a compound-split planetary gear arrangement 20. In general, as known by those skilled in the art, a four-junction point lever, as shown in FIG. 2, is established by providing two separate fixed connections, i.e., pairings, between a member of one planetary gear set and a member of another planetary gear set. Such fixed connections may, for example, be provided between a planet carrier of one gear set and a ring gear of another gear set, or between a planet carrier of one gear set and a sun gear of another. When a single such fixed connection is employed, the subject connection serves to reduce the maximum number of separately rotating inertias (about a common central axis) from six to four, and the total degrees of freedom from four to two. Thus constrained, the compound-split planetary gear arrangement 20 provides, in order of rotational speed, first, second, third, and fourth junction points. However, as understood by those skilled in the art, various compound planetary gear arrangements may be constructed to provide a four-junction point lever that will accomplish such a result, and place them within the scope of the lever diagram of FIG. 2.

As shown in FIG. 1, the compound-split planetary gear arrangement 20 includes a first planetary gear set 22 interconnected with a second planetary gear set 24 and includes two members of the first planetary gear set being operatively connected to two members of the second planetary gear set. As may be seen in FIG. 2, a lever 26 representing the compound-split planetary gear arrangement 20 includes a first, second, third, and fourth junction points 26-1, 26-2, 26-3, and 26-4, respectively. The first junction point 26-1 represents or is defined by the first member of the first planetary gear set 22, the second junction point 26-2 is defined by the second member of the first planetary gear set interconnected with the first member of the second planetary gear set 24, the third junction point 26-3 is defined by the third member of the first planetary gear set interconnected with the second member of the second planetary gear set, and the fourth junction point 26-4 is defined by the third member of the second planetary gear set.

As additionally shown in FIG. 1, the first gear set 22 includes a ring gear member 28, a carrier member 30, and a sun gear member 32. Furthermore, the second gear set 24 includes a ring gear member 34, a carrier member 36, and a sun gear member 38. As shown in FIG. 2, and consistent with the above structure of the first and second gear sets 22, 24, the first junction point 26-1 may represent the ring gear member 28 of the first gear set 22. Additionally, the second junction point 26-2 may represent the carrier member 30 of the first gear set 22 interconnected with the ring gear member 34 of the second gear set 24. The third junction point 26-3 may represent the sun gear member 32 of the first gear set 22 interconnected with the carrier member 36 of the second gear set 24. Finally, the fourth junction point 26-4 may represent the sun gear member 38 of the second gear set 24. Accordingly, the first planetary gear set 22 and the second planetary gear set 24 are connected such that the resultant structure produces a four-junction point lever that includes the junction points 26-1, 26-2, 26-3, and 26-4, although the individual gear set members do not necessarily have to be connected in the order presented above.

As shown in FIG. 3, the lever 26 may also be represented by two individual levers 39-1 and 40-1 that may correspond to the first planetary gear set 22 and the second planetary gear set 24, respectively. Accordingly, in FIG. 3, the junction points 26-2 and 26-3 are represented by fixed interconnections, such that the resultant structure effectively generates a four-junction point lever, similar to that shown in FIG. 2. As such, the propulsion system 10 shown in FIG. 1 is a specific example of a propulsion system 10 represented by the lever diagrams shown in FIGS. 2 and 3. Accordingly, the EVT 18 as shown in FIG. 1 is represented by a schematic stick diagram and depicts a specific compound-split planetary gear arrangement 20 that corresponds to and is reflected by the lever diagrams of FIGS. 2 and 3. Although a specific propulsion system 10 is represented in FIG. 1, it should be understood that the particular example is simply exemplary in nature, and other propulsion system arrangements within the scope of the lever diagrams of FIGS. 2 and 3 are also contemplated.

As may be seen in FIG. 1, the engine 12 and the first motor-generator 14 are disposed on a common first rotating axis 41 and the second motor/generator is disposed on a second rotating axis 42, wherein the first axis 41 is substantially parallel to the second axis 42.

The propulsion system 10 may also include one or more transfer gear shafts, such as an intermediate or inner shaft 44-1 and an outer shaft 44-2 configured to rotate about a fourth axis 43. A transfer gear set 44 is set coaxially for rotation with respect to the intermediate inner shaft 44-1 and outer shaft 44-2 about the axis 43. The transfer gear-set 44 includes a first transfer gear 72, a second transfer gear 73, and a third transfer gear 76. The transfer gear 72 is continuously connected to the outer shaft 44-2, and may thus be splined and/or pinned to the outer shaft 44-2. The second transfer gear 73 and third transfer gear 76 are continuously connected or fixed to the intermediate inner shaft 44-1. The second and third transfer gears 73, 76 are generally configured to rotate in the same direction with respect to the first transfer gear 72 about the fourth axis 43, but at dissimilar rates, i.e., the rotation of the second and third transfer gears 73, 76 with respect to the first transfer gear 72 is asynchronous.

The first transfer gear 72 is directly connected to the third input member 50 via a drive gear 72-1. The second transfer gear 73 is directly connected to the differential 53. The first ring gear 28 may be in mesh with the first transfer gear 72. The second ring gear 34 may be in mesh with the third transfer gear 76. The second and third transfer gears 73, 76 may each be mounted on the inner shaft 44-1, while the first transfer gear 72 is mounted on the outer shaft 44-2. The outer shaft 44-2 may then be supported with respect to the intermediate inner shaft 44-1 via bearings (not shown). The intermediate shafts 44-1, 44-2 and transfer gear set 44 could have any other suitable configuration, such as a single-stage or two-stage parallel shaft transfer gear set.

With continued reference to FIG. 1, the engine 12, the first motor-generator 14, and the second motor-generator 16 are operatively connected to the EVT 18 via an input member arrangement, which transmits torque from the power sources to the compound-split planetary gear arrangement 20. The input member arrangement includes an output shaft of the engine 12, which serves as an input member 46; a rotor of the first motor-generator 14, which serves as an input member 48; and a rotor of the second motor-generator 16, which serves as the input member 50. The input member 46 is configured to provide engine torque to the EVT 18. The input member 48 and input member 50 are each configured to provide torque from the first motor-generator 14 and the second motor-generator 16, respectively, to the EVT 18. As may be seen in FIGS. 2-3, the input member 46 is continuously connected to the third junction point 26-3, the input member 48 is continuously connected to the fourth junction point 26-4, and the input member 50 may be continuously connected to the first junction point 26-1. The input member 50 may be connected to the first junction point 26-1 through the transfer gear 72.

The EVT 18 also includes an output member 52. The output member 52 may be continuously connected to the second junction point 26-2 and is configured to provide output torque from the compound-split planetary gear arrangement 20 for launching and propelling the vehicle. In some variations, the output member 52 may be connected to the second junction point 26-2 through the transfer gear 76 and shaft 44-1. In some forms, the output member 52 may be configured as a chain drive member that connects the carrier member 30 to a differential unit 53. The output member 52 may also be configured as a gear drive.

As may be seen in FIGS. 1-3, the EVT 18 also includes a stationary member such as a transmission case or housing 54. The case 54 at least partially encases the input members 46, 48, 50. The stationary member or case 54 remains stationary while one or more input members 46, 48, 50 rotate about an axis. To this end, the stationary member 54 may be fixed to the vehicle body. Accordingly, the stationary member (e.g., case 54) remains constrained or substantially stationary relative to the vehicle body.

The third junction point 26-3 is selectively connectable with the case 54 via an engageable torque-transmitting device or mechanism 56, to thereby ground the junction point 26-3. The torque-transmitting mechanism 56 may be selectively engaged and disengaged via an electrically actuated device, such as a solenoid. Additionally, the torque-transmitting mechanism 56 may be configured either as a band, a roller-ramp one-way-clutching, a dog clutch, or a sprag type of a brake. Accordingly, the torque-transmitting mechanism 56 may be used to brake the third junction point 26-3 relative to the case 54.

The preceding configurations of the EVT 18 provides a first mode for launching a vehicle from rest and a separate second mode for propelling the subject vehicle at higher speeds. The EVT 18 is a single-mode compound-split electro-mechanical drive unit that enables sufficient torque to be generated and channeled for launching and propelling the vehicle, as well as supports an engine stop-start function. Additionally, the EVT 18 is capable of providing reduced losses in operating efficiency of the propulsion system 10 during both drive and electric regeneration of the vehicle's energy storage system operating modes. Moreover, because the EVT 18 has an off-axis layout, i.e., has the engine 12 and the motor/generator 14 disposed on the first rotating axis 41 while the motor/generator 16 is disposed on the second rotating axis 42, the EVT 18 is particularly suitable to front-wheel-drive vehicle applications, where the propulsion system 10 is situated substantially transversely with respect to longitudinal axis of the subject vehicle.

Figure 4:
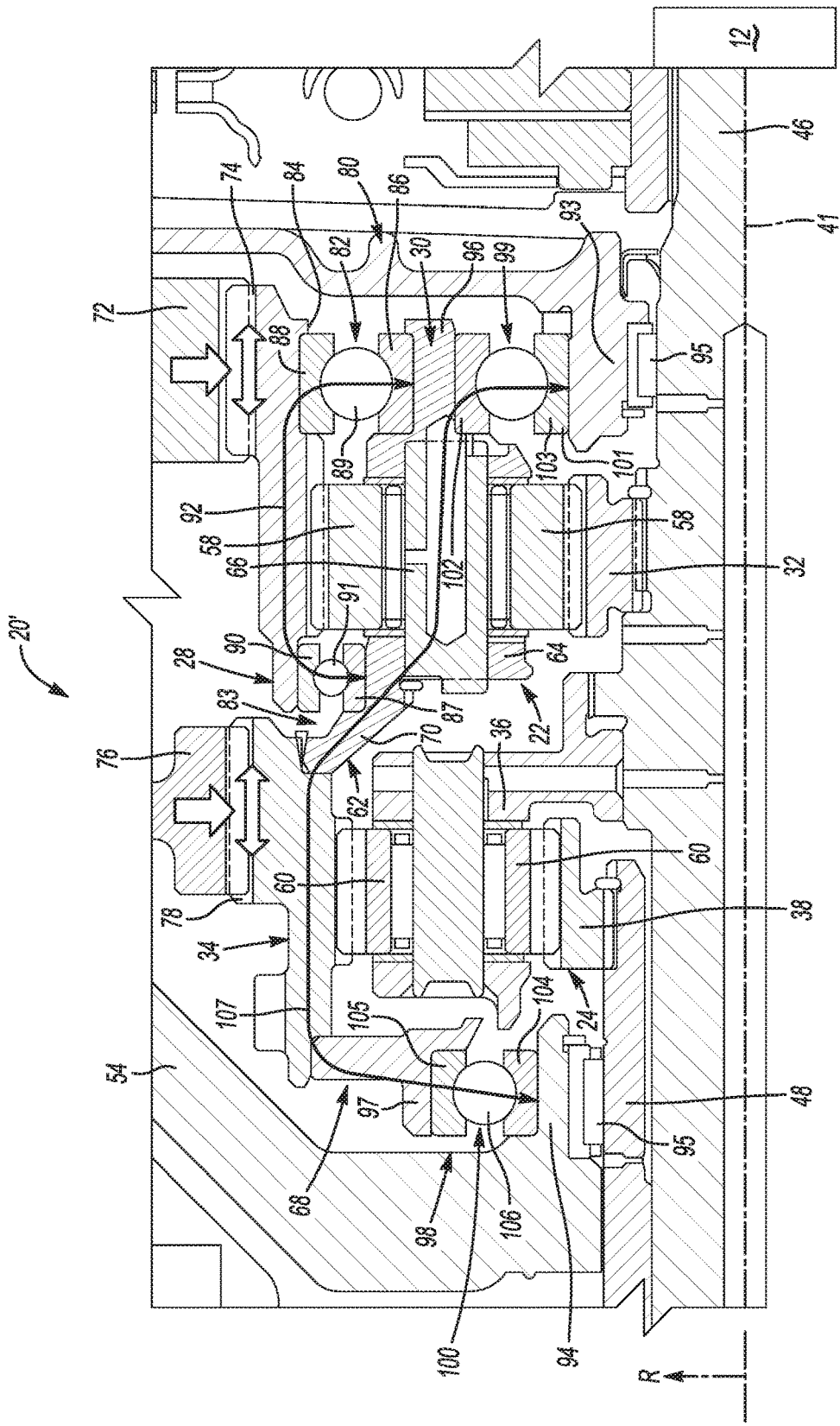
FIG. 4 is a cross-sectional view of a transmission having a planetary gear arrangement, which may be implemented in conjunction with the EVT illustrated in FIGS. 1-3, in accordance with the principles of the present disclosure.

Referring now to FIG. 4, a specific example of a planetary gear arrangement or assembly 20' for use with the propulsion system 10 described in FIGS. 1-3 is shown. Though the planetary gear arrangement 20' may be the planetary gear arrangement 20 within the specific EVT 18 illustrated in FIGS. 1-3, it should be understood that the planetary gear arrangement 20' illustrated in FIG. 4 may alternatively be used in another propulsion system having different connections from the example EVT 18 shown in FIGS. 1-3.

Elements described already in FIG. 1 and shown in FIG. 4 have the same element numbers. Thus, the planetary gear arrangement 20' includes two simple planetary gear sets 22, 24 disposed adjacent to each other in a side-by-side configuration, which have elements interconnected to form an interconnected planetary gear assembly, also called a compound planetary gear arrangement above. In some variations, however, more than two planetary gear sets 22, 24 could be used.

The first planetary gear set 22 includes the first sun gear 32, the first ring gear 28, and the first carrier member 30. The carrier member, or carrier 30, bears a plurality of first planet gears 58. The first planet gears 58 are connected to the carrier 30 by pinions that allow that the planet gears 58 to rotate with respect to the carrier 30. The planet gears 58, in this example, are in meshing engagement with both the first sun gear 32 and the first ring gear 28. It should be understood, however, that in other examples, such as in a compound planetary gear set, the planet gears 58 could be in meshing engagement with either the sun gear 32 or the ring gear 28 and with a second set of pinion gears. Each first planet gear 58 is configured to translate about the first sun gear 32 when the first carrier 30 rotates with respect to the first sun gear 32.

Like the first planetary gear set 22, the second planetary gear set 24 also has a sun gear, a ring gear, and a carrier, as described in FIG. 1. For example, the second planetary gear set 24 includes the second sun gear 38, the second ring gear 34, and the second carrier 36. The carrier member, or carrier 36, bears a plurality of second planet gears 60. The second planet gears 60 are connected to the carrier 36 by pinions that allow that the planet gears 60 to rotate with respect to the carrier 36. The planet gears 60, in this example, are in meshing engagement with both the second sun gear 38 and the second ring gear 34. It should be understood, however, that in other examples, such as in a compound planetary gear set, the planet gears 60 could be in meshing engagement with either the sun gear 38 or the ring gear 34 and with a second set of pinion gears. Each second planet gear 60 is configured to translate about the second sun gear 38 when the second carrier 36 rotates with respect to the second sun gear 38.

A bridge portion 62 connects the second ring gear 34 to the first carrier 30. In this example, the first carrier 30 has an inner side 64 disposed adjacent to the first sun gear 32 and an outer side 66 disposed adjacent to the first ring gear 28. The bridge portion 62 is connected to the outer side 64 of the first carrier 30. Thus, the bridge portion 62 is disposed radially outward of the first sun gear 32. In this example, none of the bridge portion 62 overlaps with the sun gear 32 along a radial direction R. The bridge portion 62, the second ring gear 34, and the first carrier 30 together form a tubular bridge structure 68. In this example, the bridge portion 62 has a middle part 70 that has a conical shape.

As described above in FIG. 1, and also depicted in FIG. 4, the input member 46 connected to the engine 12 is disposed along a central axis 41 and is coupled to the first sun gear 32 and the second carrier 36. The second sun gear 38 is coupled to the input member 48 of the first motor-generator 14, which is also concentric about the central axis 41. Thus, the input member 46 is operable to transfer torque to the first sun gear 32, and the input member 48 is operable to transfer torque to the second sun gear 38, in this example.

The first transfer gear 72 is disposed in meshing engagement with an outer side 74 of the first ring gear 28. The third transfer gear 76 is disposed in meshing engagement with an outer side 78 of the second ring gear 34. In other words, the ring gears 28, 34 form internal and external ring gears (with engaging members, such as teeth, on both inner and outer sides), which may be formed integrally as one-piece or as two parts of each ring gear 28, 34 that are attached together.

Either of the transfer gears 72, 76 may be operatively coupled to at least one of the first and second motor-generators 14, 16, such as through the transfer gear set 44 and/or input shaft 50 to transmit torque therebetween. For example, the first and third transfer gears 72, 76 may be connected to a transfer gear shaft 44-1, 44-2 or the input member 50, that is parallel to the input members 46, 48. Either transfer gear 72, 76 could also or alternatively be connected to the final drive assembly including the differential 53, in some variations.

A first bearing arrangement 80, or a first ring bearing arrangement 80, is disposed between the first ring gear 28 and the bridge structure 68, with the carrier 30 forming part of the bridge structure 68. In this example, the first bearing arrangement 80 includes a first ball bearing assembly 82 and a second ball bearing assembly 83. The first ball bearing assembly 82 is constrained by, or supporting, an inner side 84 of the first ring gear 28 and by the first carrier 30.

Thus, the first ball bearing assembly 82 has an inner race 86 coupled to the first carrier 30 and an outer race 88 coupled to the inner side 84 of the first ring gear 28, with a plurality of balls 89 disposed between the races 86, 88. The inner and outer races 86, 88 have a substantially annular shape and are spaced apart from each other so as to define an annular groove, which is configured, shaped, and sized to receive the balls 89.

The second ball bearing assembly 83 is constrained by, or supporting, an inner side 84 of the first ring gear 28 and the bridge portion 62. Thus, the second ball bearing 83 has an inner race 87 coupled to the bridge portion 62 and an outer race 90 coupled to the inner side 84 of the first ring gear 28, with a plurality of balls 91 disposed between the races 87, 90. The inner and outer races 87, 90 have a substantially annular shape and are spaced apart from each other so as to define an annular groove, which is configured, shaped, and sized to receive the balls 91.

A radial load caused by the first transfer gear 72 (which may originate with other structure coupled to the transfer gear 72) is represented by line 92. The load 92 is resolved through the first bearing arrangement 80, including first and second bearing assemblies 82, 83, to the bridge structure 68, which includes the first carrier 30, the bridge portion 62, and the second ring gear 34. The bridge structure 68 and the first bearing arrangement 80 are offset from the input members 46, 48 and the central axis 41. Accordingly, the load 92 is substantially transferred from the transfer gear 72 to the first ring gear 28 and through the first bearing arrangement 80 to the bridge structure 68 without being substantially transferred to the input member 46 or the input member 48. Thus, the planetary gear assembly 20' is free of any bearing assembly constrained by both the input member 46 and the first ring gear 28. Accordingly, loads from the first transfer gear 72 are not applied to the input member 46 and do not cause a bending moment on the input member 46.

The case 54 has a first case portion 93 extending from and connected to the case 54 and a second case portion 94 extending from and connected to the case 54, where the first and second case portions 93, 94 are spaced apart from each other. The first and second case portions 93, 94 may have roller bearings 95 disposed between the case portions 93, 94 and the input members 46, 48 respectively. The bridge structure 68 further includes a first bridge extension 96 extending from the first carrier 30 and a second bridge extension 97 extending from the second ring gear 34.

A second bearing arrangement 98 is disposed between the bridge structure 68 and the case 54, and more specifically, the case portions 93, 94. The second bearing arrangement 98 includes a first carrier bearing assembly 99 constrained by, or supporting, the first case portion 93 and the first bridge extension 96. The second bearing arrangement 98 also includes a second ring bearing assembly 100 constrained by, or supporting, the second case portion 94 and the second bridge extension 97.

In this example, the first carrier bearing assembly 99 and the second ring bearing assembly 100 are each ball bearings. Thus, the first carrier bearing assembly 99 has an inner race 101 coupled to the first case portion 93 and an outer race 102 coupled to the first bridge extension 96, with a plurality of balls 103 disposed between the races 101, 102. The inner and outer races 101, 102 have a substantially annular shape and are spaced apart from each other so as to define an annular groove, which is configured, shaped, and sized to receive the balls 103.

The second ring bearing assembly 100 has an inner race 104 coupled to the second case portion 94 and an outer race 105 coupled to the second bridge extension 97, with a plurality of balls 106 disposed between the races 104, 105. The inner and outer races 104, 105 have a substantially annular shape and are spaced apart from each other so as to define an annular groove, which is configured, shaped, and sized to receive the balls 106.

A radial load caused by the third transfer gear 76 (which may originate with other structure coupled to the transfer gear 76) is represented by line 107. The load 107 is resolved through the second bearing arrangement 98, including the first carrier bearing assembly 99 and the second ring bearing assembly 100, to the case 54. The bridge structure 68, the case portions 93, 94, and the second bearing arrangement 98 are offset from the input members 46, 48 and the central axis 41. Accordingly, the load 107 is substantially transferred from the transfer gear 76 to the second ring gear 34, and therefore the bridge structure 68 and bridge extensions 96, 97, and then through the second bearing arrangement 98 to the first and second case portions 93, 94 without being substantially transferred to the input member 46 or the input member 48. Thus, the planetary gear assembly 20' is free of any bearing assembly constrained by both the input member 46 and the bridge structure 68. Accordingly, loads from the third transfer gear 76 are not applied to the input member 46 and do not cause a bending moment on the input member 46. The bridge structure 68 thus spans between the first and second case portions 93, 94 effectively to resolve loads 92, 107 from the transfer gears 72, 76 to the case 54.

Figure 5:
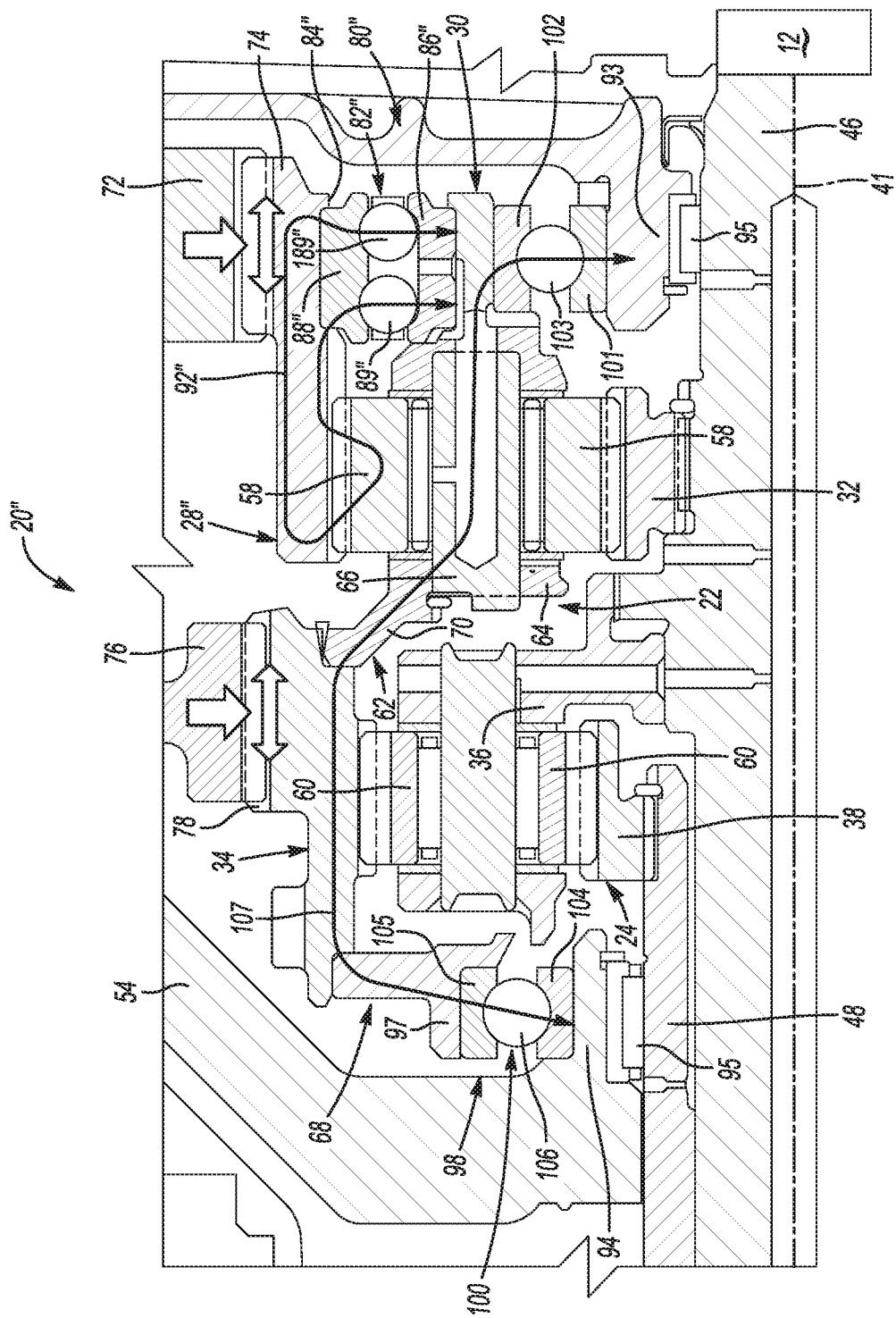
FIG. 5 is a cross-sectional view of another variation of a transmission having a planetary gear arrangement, which may be implemented in conjunction with the EVT illustrated in FIGS. 1-3, according to the principles of the present disclosure.

Referring now to FIG. 5, another specific example of a planetary gear arrangement 20" for use with the propulsion system 10 described in FIGS. 1-3 is shown. Though the planetary gear arrangement 20" may be the planetary gear arrangement 20 within the specific EVT 18 illustrated in FIGS. 1-3, it should be understood that the planetary gear arrangement 20" illustrated in FIG. 5 may alternatively be used in another propulsion system having differences from the example EVT 18 shown in FIGS. 1-3.

Elements described already in FIG. 1 and shown in FIG. 5 have the same element numbers. Moreover, the planetary gear arrangement 20" illustrated in FIG. 5 has many similarities with the planetary gear arrangement 20' illustrated in FIG. 4. Accordingly, any elements having like numerals as those shown in FIG. 1 or 4 should be considered the same as in FIG. 5, and the description with respect to FIGS. 1 and 4 above therefore applies equally to the planetary gear arrangement 20" in FIG. 5 and will not be described again in this section.

The only difference between the planetary gear arrangement 20" illustrated in FIG. 5 compared to that of FIG. 4 is the bearing arrangement 80" associated with the first ring gear 28". The bearing arrangement 80" provided for the ring gear 28", instead of including first and second bearing assemblies 82, 83 as in FIG. 4, includes a single bearing assembly 82". The single bearing assembly 82" may be a dual-row bearing assembly, such as a dual-row angular-contact ball bearing (DRACBB) assembly, or a dual-row deep-groove ball bearing (DRDGBB) assembly, by way of example.

The bearing assembly 82" is disposed between the first ring gear 28" and the first carrier 30 and/or the bridge structure 68 (because the first carrier 30 forms a part of the bridge structure 68). The bearing assembly 82" is constrained by, or supporting, an inner side 84" of the first ring gear 28" and by the bridge structure 68 (including the first carrier 30).

Thus, the bearing assembly 82" has an inner race 86" coupled to the first carrier 30 and an outer race 88" coupled to the inner side 84" of the first ring gear 28", with a row of first balls 89" and a row of second balls 189" disposed between the races 86", 88". The inner and outer races 86", 88" have a rounded shape and are spaced apart from each other so as to define a groove with rounded edges, which is configured, shaped, and sized to receive the rows of first and second balls 89", 189".

A radial load caused by the first transfer gear 72 (which may originate with other structure coupled to the transfer gear 72) is represented by line 92". The load 92" is resolved through the first bearing arrangement 80", including the bearing assembly 82", to the bridge structure 68, which includes the first carrier 30. The bridge structure 68 and the first bearing arrangement 80" are offset from the input members 46, 48 and the central axis 41. Accordingly, the load 92" is substantially transferred from the transfer gear 72 to the first ring gear 28" and through the first bearing arrangement 80" to the bridge structure 68 without being substantially transferred to the input member 46 or the input member 48. Thus, the planetary gear assembly 20" is free of any bearing assembly constrained by both the input member 46 and the first ring gear 28". Accordingly, loads from the first transfer gear 72 are not applied to the input member 46 and do not cause a bending moment on the input member 46.

Figure 6:
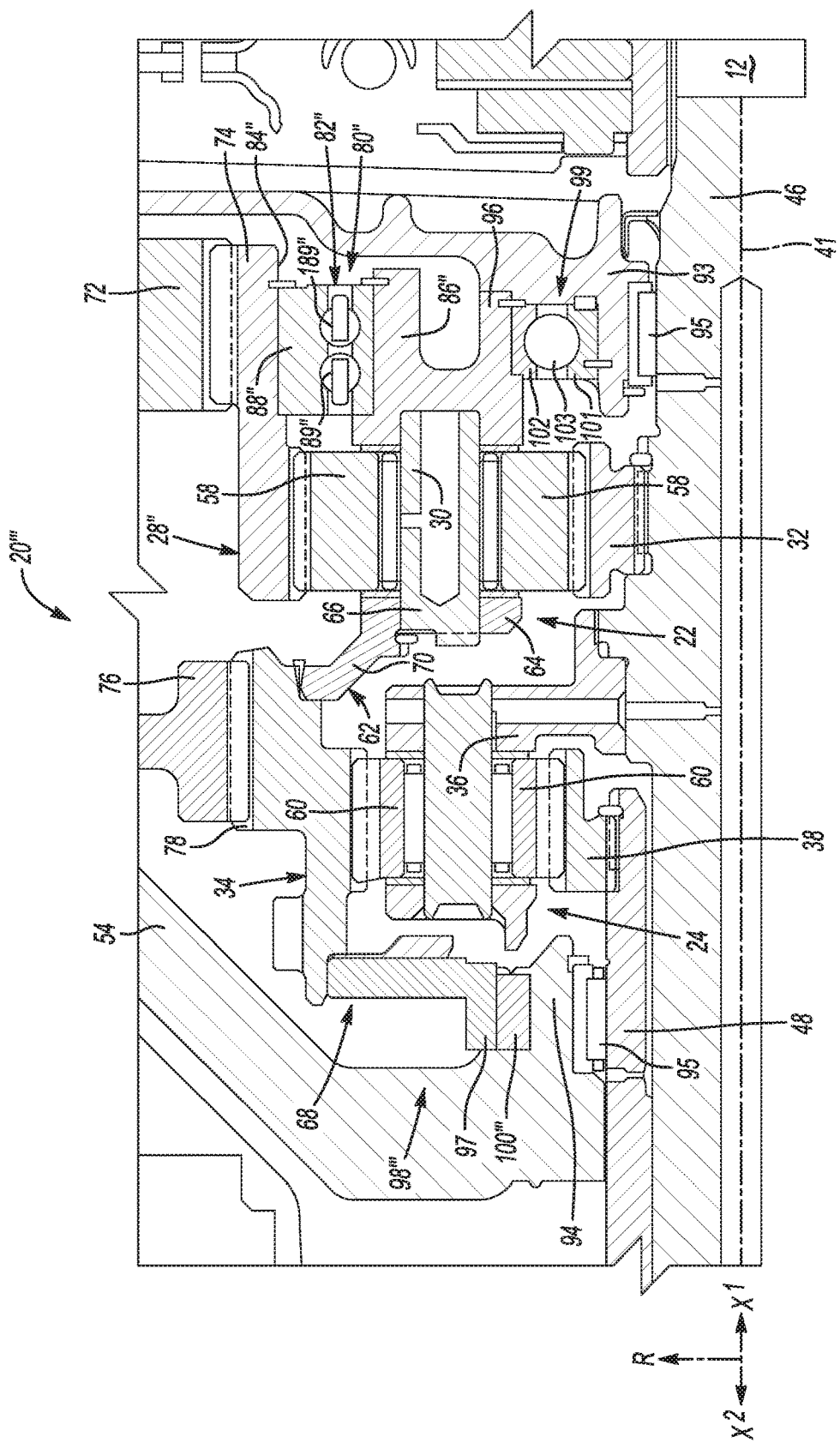
FIG. 6 is a cross-sectional view of yet another variation of a transmission having a planetary gear arrangement, which may be implemented in conjunction with the EVT illustrated in FIGS. 1-3, according to the principles of the present disclosure.

Referring now to FIG. 6, yet another specific example of a planetary gear arrangement 20'" for use with the propulsion system 10 described in FIGS. 1-3 is shown. Though the planetary gear arrangement 20'" may be the planetary gear arrangement 20 within the specific EVT 18 illustrated in FIGS. 1-3, it should be understood that the planetary gear arrangement 20'" illustrated in FIG. 6 may alternatively be used in another propulsion system having differences from the example EVT 18 shown in FIGS. 1-3.

Elements described already in FIG. 1 and shown in FIG. 6 have the same element numbers. Moreover, the planetary gear arrangement 20'" illustrated in FIG. 6 has many similarities with the planetary gear arrangements 20', 20" illustrated in FIGS. 4 and 5. Accordingly, any elements having like numerals as those shown in FIG. 1, 4, or 5 should be considered the same as in FIG. 6, and the description with respect to FIGS. 1, 4, and 5 above therefore applies equally to the planetary gear arrangement 20'" illustrated in FIG. 6 and will not be described again in this section. Particularly, the planetary gear assembly 20'" illustrated in FIG. 6 has the same first bearing assembly 80" illustrated in FIG. 5.

The only difference between the planetary gear arrangement 20'" illustrated in FIG. 6 compared to that of FIG. 5 is the second bearing arrangement (labeled as 98'" in this example) associated with the bridge structure 68. The second bearing arrangement 98'" still includes the first carrier bearing assembly 99 constrained by, or supporting, the first case portion 93 and the first bridge extension 96, which is a ball bearing assembly. However, instead of including the second ring bearing assembly 100 as a ball bearing shown in FIGS. 4-5, the second bearing arrangement 98'" includes a roller bearing 100'" constrained by, or supporting, the second case portion 94 and the second bridge extension 97.

The roller bearing 100'" can reduce net loss since the roller bearing may be lower in pitch-circle diameter as compared to a ball bearing. Accordingly, the second bearing arrangement 98'" may form a fixed, free bearing arrangement configured to support axial and radial loads on the case portions 93, 94. As used herein, the term "fixed, free bearing arrangement" refers to a group of bearings coupled to a component of the EVT 18, such as the case portions 93, 94, in order to support axial and radial loads acting on the that component. Specifically, the term "fixed, free bearing arrangement" refers to a plurality of bearings, wherein one or more bearings support the axial and radial loads acting on a component and another bearing (or group of bearings) only support the radial loads acting on that component. In other words, in a fixed, free bearing arrangement, at least one bearing 99 is constrained or substantially stationary along the radial direction R as well as the first and second axial directions X1, X2, and at least one other bearing 100''' is constrained or substantially stationary along the radial direction R but is free to move along the first and second axial directions X1, X2. In this case, the first ball bearing assembly 99 is constrained in the R, X1, and X2 directions, and the second roller bearing 100''' is constrained only in the R direction. The fixed, free bearing arrangements in the EVT 18 may help minimize mechanical losses by minimizing the effective bearing mean diameters of the bearings. The fixed, free bearing arrangement 98''' supports axial and radial loads acting on the case portions 93, 94.

In the present disclosure, the term "axial load" refers to forces acting on a component of the EVT 18, such as the case portions 93, 94, in the first axial direction X1 or the second axial direction X2. The term "radial load" refers to forces acting on a component of the EVT 18 in the radial direction R. In addition, the term "radial load" may include forces acting on a component of the EVT 18 along a direction obliquely angled to the first axial direction X1 and the second axial direction X2.

Figure 7:
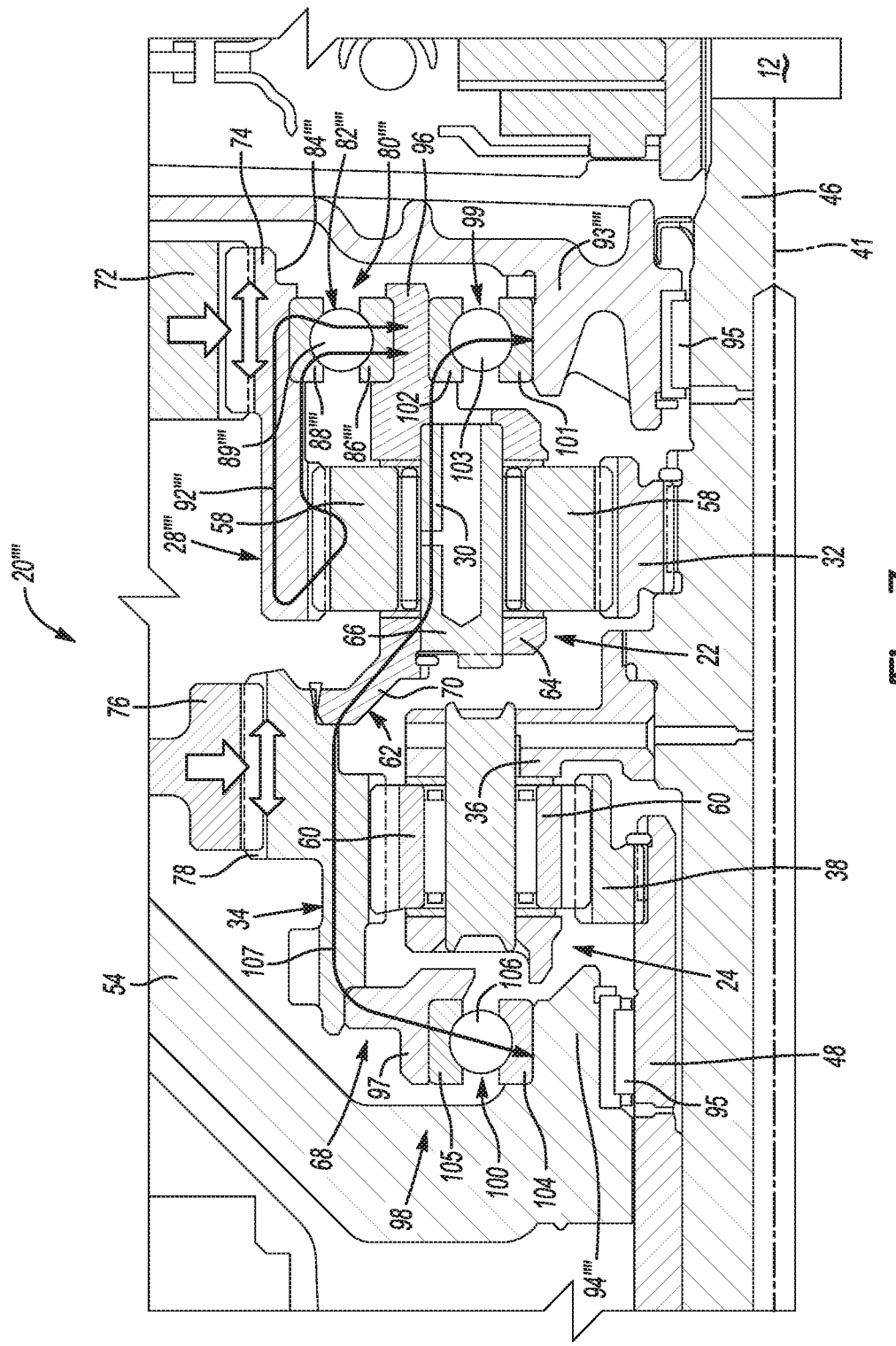
FIG. 7 is a cross-sectional view of still another variation of a transmission having a planetary gear arrangement, which may be implemented in conjunction with the EVT illustrated in FIGS. 1-3, according to the principles of the present disclosure.

Referring now to FIG. 7, still another specific example of a planetary gear arrangement or assembly 20'''' for use with the propulsion system 10 described in FIGS. 1-3 is shown. Though the planetary gear arrangement 20'''' may be the planetary gear arrangement 20 within the specific EVT 18 illustrated in FIGS. 1-3, it should be understood that the planetary gear arrangement 20'''' illustrated in FIG. 7 may alternatively be used in another propulsion system having differences from the example EVT 18 shown in FIGS. 1-3.

Elements described already in FIG. 1 and shown in FIG. 7 have the same element numbers. Moreover, the planetary gear arrangement 20'''' illustrated in FIG. 7 has many similarities with the planetary gear arrangements 20', 20'', 20''' illustrated in FIGS. 4-6. Accordingly, any elements having like numerals as those shown in FIG. 1 or 4-6 should be considered the same as in FIG. 7, and the description with respect to FIG. 1 or 4-6 above therefore applies equally to the planetary gear arrangement 20'''' in FIG. 7 and will not be described again in this section. Particularly, the planetary gear arrangement/assembly 20'''' illustrated in FIG. 7 is mostly the same as the planetary gear arrangement 20'' illustrated in FIG. 5.

The only difference between the planetary gear arrangement 20'''' illustrated in FIG. 7 compared to that of FIG. 5 is the bearing assembly associated with the first ring gear, which is labeled as 28'''' in this example. The bearing arrangement 80'''' provided for the ring gear 28'''' in FIG. 7, instead of including a dual-row bearing assembly 82'', includes merely a single row bearing assembly 82'''', such as a 4-point-contact ball bearing assembly, or even a controlled clearance DGBB assembly, by way of example.

The single-row bearing assembly 82'''' is disposed between the first ring gear 28'''' and the first carrier 30 and/or the bridge structure 68 (because the first carrier 30 forms a part of the bridge structure 68). The bearing assembly 82'''' is constrained by, or supports, an inner side 84'''' of the first ring gear 28'''' and the first carrier 30 (part of the bridge structure 68).

Thus, the bearing assembly 82'''' has an inner race 86'''' coupled to the first carrier 30 and an outer race 88'''' coupled to the inner side 84'''' of the first ring gear 28'''', with a single row of balls 89'''' disposed between the races 86'''', 88''''.

A radial load caused by the first transfer gear 72 (which may originate with other structure coupled to the transfer gear 72) is represented by line 92''''. The load 92'''' is resolved through the first bearing arrangement 80'''', including the bearing assembly 82'''', to the bridge structure 68, which includes the first carrier 30. The bridge structure 68 and the first bearing arrangement 80'''' are offset from the input members 46, 48 and the central axis 41. Accordingly, the load 92'''' is substantially transferred from the transfer gear 72 to the first ring gear 28'''' and through the first bearing arrangement 80'''' to the bridge structure 68 without being substantially transferred to the input member 46 or the input member 48. Thus, the planetary gear assembly 20'''' is free of any bearing assembly constrained by both the input member 46 and the first ring gear 28''''. Accordingly, loads from the first transfer gear 72 are not applied to the input member 46 and do not cause a bending moment on the input member 46.

Using only a single bearing assembly 82'''' in the first bearing arrangement 80'''' may compact some of the radial space in the assembly 20'''', and accordingly, the first and second case portions 93'''', 94'''' may be designed as larger case extensions than in the previous examples, as shown in FIG. 7.

Any of the ball bearings described herein may be provided as deep groove ball bearings, by way of example, and the roller bearings may be provided as needle roller bearings. Each roller bearing includes a plurality of rollers along its circumference.

The description is merely exemplary in nature and variations that do not depart from the gist of the disclosure are intended to be within the scope of the disclosure. Such variations are not to be regarded as a departure from the spirit and scope of the disclosure.

What is claimed is:

1. A planetary gear assembly for transferring torque in an automotive transmission comprising:
   a first planetary gear set comprising a first sun gear, a first ring gear, and a first carrier bearing a plurality of first planet gears, the first planet gears being in meshing engagement with at least one of the first sun gear and the first ring gear, each first planet gear being configured to translate about the first sun gear, the first carrier having a radially inner side disposed adjacent to the first sun gear and a radially outer side disposed adjacent to the first ring gear;
   a second planetary gear set disposed adjacent to the first planetary gear set, the second planetary gear set comprising a second sun gear, a second ring gear, and a second carrier bearing a plurality of second planet gears, the second planet gears being in meshing engagement with at least one of the second sun gear and the second ring gear, each second planet gear being configured to translate about the second sun gear; and
   a bridge portion connecting the second ring gear to the radially outer side of the first carrier, the bridge portion being disposed radially outward of the first sun gear such that none of the bridge portion overlaps with the first sun gear in a radial direction, wherein the bridge portion, the second ring gear, and the first carrier together form a bridge structure.

2. The planetary gear assembly of claim 1, further comprising a first bearing arrangement including at least one first ring bearing assembly constrained by the first ring gear and the bridge structure.

3. The planetary gear assembly of claim 2, further comprising:
   a transfer gear in meshing engagement with a radially outer side of the first ring gear; and
   an input member extending along a central axis, wherein at least one gear of the first and second planetary gear sets is operatively coupled to the input member such that torque is transferred from the input member to the at least one gear of the first and second planetary gear sets.

4. The planetary gear assembly of claim 3, wherein a middle part of the bridge portion has a conical shape.

5. The planetary gear assembly of claim 4, the planetary gear assembly being free of any bearing assembly constrained by both the input member and the first ring gear.

6. The planetary gear assembly of claim 5, the planetary gear assembly being arranged such that a first load is substantially transferred from the transfer gear to the first ring gear and through the first bearing arrangement to the bridge structure without being substantially transferred to the input member.

7. The planetary gear assembly of claim 5, the bridge structure further comprising a first bridge extension extending from the first carrier and a second bridge extension extending from the second ring gear, the planetary gear assembly further comprising:
   a first case portion;
   a second case portion coupled to the first case portion; and
   a second bearing arrangement comprising:
      a first carrier bearing assembly constrained by the first case portion and the first bridge extension; and
      a second ring bearing assembly constrained by the second case portion and the second bridge extension.

8. The planetary gear assembly of claim 7, the transfer gear being a first transfer gear, the planetary gear assembly further comprising:
   a second transfer gear in meshing engagement with a radially outer side of the second ring gear; and
   an electric motor-generator operatively coupled to at least one of the first and second transfer gears such that torque is transmitted between the electric motor-generator and the at least one of the first and second transfer gears.

9. The planetary gear assembly of claim 8, the planetary gear assembly being free of any bearing assembly constrained by both the input member and the bridge structure.

10. The planetary gear assembly of claim 9, the planetary gear assembly being arranged such that a second load is substantially transferred from the second transfer gear to the bridge structure and through the second bearing arrangement to the first and second case portions without being substantially transferred to the input member.

11. The planetary gear assembly of claim 10, wherein each of the first and second bearing arrangements comprise at least one of a ball bearing and a roller bearing.

12. A planetary gear assembly for transferring torque in an automotive transmission comprising:
   a first planetary gear set comprising a first sun gear, a first ring gear, and a first carrier bearing a plurality of first planet gears, the first planet gears being in meshing engagement with at least one of the first sun gear and the first ring gear;
   a second planetary gear set disposed adjacent to the first planetary gear set, the second planetary gear set comprising a second sun gear, a second ring gear, and a second carrier bearing a plurality of second planet gears, the second planet gears being in meshing engagement with at least one of the second sun gear and the second ring gear;
   a bridge portion connecting the second ring gear to the first carrier;
   a first bridge extension extending from the first carrier;
   a second bridge extension extending from the second ring gear, wherein the bridge portion, the second ring gear, the first carrier, the first bridge extension, and the second bridge extension together form a bridge structure;
   a first bearing arrangement including at least one first ring bearing assembly constrained by the first ring gear and the bridge structure;
   a first case portion;
   a second case portion coupled to the first case portion; and
   a second bearing arrangement, the second bearing arrangement comprising:
      a first carrier bearing assembly constrained by the first case portion and the first bridge extension; and
      a second ring bearing assembly constrained by the second case portion and the second bridge extension.

13. The planetary gear assembly of claim 12, further comprising:
   a first transfer gear in meshing engagement with a radially outer side of the first ring gear;
   a second transfer gear in meshing engagement with a radially outer side of the second ring gear;
   an electric motor-generator operatively coupled to at least one of the first and second transfer gears such that torque is transmitted between the electric motor-generator and the at least one of the first and second transfer gears; and
   an input member extending along a central axis, wherein at least one gear of the first and second planetary gear sets is operatively coupled to the input member such that torque is transferred from the input member to the at least one gear of the first and second planetary gear sets.

14. The planetary gear assembly of claim 13, the planetary gear assembly being free of any bearing assembly constrained by both the input member and the first ring gear.

15. The planetary gear assembly of claim 14, the planetary gear assembly being arranged such that a first load is substantially transferred from the transfer gear to the first ring gear and through the first bearing arrangement to the bridge structure without being substantially transferred to the input member.

16. The planetary gear assembly of claim 15, the planetary gear assembly being free of any bearing assembly constrained by both the input member and the bridge structure.

17. The planetary gear assembly of claim 16, the planetary gear assembly being arranged such that a second load is substantially transferred from the second transfer gear to the bridge structure and through the second bearing arrangement to the first and second case portions without being substantially transferred to the input member.

18. The planetary gear assembly of claim 17, wherein each of the first and second bearing arrangements comprise at least one of a ball bearing and a roller bearing.

19. An electro-mechanical drive unit for a motor vehicle, comprising:

a stationary member comprising a first case portion and a second case portion;

a planetary gear arrangement including a first planetary gear set interconnected with a second planetary gear set to form a first junction point, a second junction point, a third junction point, and a fourth junction point, the first planetary gear set comprising a first sun gear, a first ring gear, and a first carrier bearing a plurality of first planet gears, the first planet gears being in meshing engagement with at least one of the first sun gear and the first ring gear, each first planet gear being configured to translate about the first sun gear, the second planetary gear set disposed adjacent to the first planetary gear set, the second planetary gear set comprising a second sun gear, a second ring gear, and a second carrier bearing a plurality of second planet gears, the second planet gears being in meshing engagement with at least one of the second sun gear and the second ring gear, each second planet gear being configured to translate about the second sun gear, the planetary gear arrangement further comprising a bridge portion connecting the second ring gear to the first carrier;

a first motor-generator operatively connected to the fourth junction point of the planetary gear arrangement;

a second motor-generator operatively connected to the first junction point of the planetary gear arrangement;

an output member operatively connected to the second junction point of the planetary gear arrangement;

a torque-transmitting mechanism engageable to ground the third junction point to the stationary member; and a first bearing arrangement including at least one first ring bearing assembly constrained by the first ring gear and the first carrier;

a first transfer gear in meshing engagement with a radially outer side of the first ring gear;

a second transfer gear in meshing engagement with a radially outer side of the second ring gear, at least one of the first and second electric motor-generators being operatively coupled to at least one of the first and second transfer gears such that torque is transmitted between the at least one of the first and second electric motor-generators and the at least one of the first and second transfer gears;

an input member extending along a central axis, wherein at least one gear of the first and second planetary gear sets is operatively coupled to the input member such that torque is transferred from the input member to the at least one gear of the first and second planetary gear sets;

a first bridge extension extending from the first carrier;

a second bridge extension extending from the second ring gear; and a second bearing arrangement comprising:
　a first carrier bearing assembly constrained by the first case portion and the first bridge extension; and
　a second ring bearing assembly constrained by the second case portion and the second bridge extension.

\* \* \* \* \*